US012130571B2

(12) United States Patent
Lee

(10) Patent No.: US 12,130,571 B2
(45) Date of Patent: Oct. 29, 2024

(54) FIXING APPARATUS FOR MINIMIZING ABRASION OF CONTACT SURFACE BETWEEN HEATER AND FIXING BELT

(71) Applicant: Hewlett-Packard Development Company, L.P., Spring, TX (US)

(72) Inventor: Sunhyung Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/027,615

(22) PCT Filed: Jun. 17, 2021

(86) PCT No.: PCT/US2021/037739
§ 371 (c)(1),
(2) Date: Mar. 21, 2023

(87) PCT Pub. No.: WO2022/081215
PCT Pub. Date: Apr. 21, 2022

(65) Prior Publication Data
US 2023/0384720 A1 Nov. 30, 2023

(30) Foreign Application Priority Data
Oct. 14, 2020 (KR) .................. 10-2020-0132323

(51) Int. Cl.
*G03G 15/20* (2006.01)
*B32B 15/08* (2006.01)
*B32B 15/18* (2006.01)
*B32B 27/28* (2006.01)

(52) U.S. Cl.
CPC ......... *G03G 15/2057* (2013.01); *B32B 15/08* (2013.01); *B32B 15/18* (2013.01); *B32B 27/285* (2013.01); *B32B 2307/7376* (2023.05); *B32B 2433/00* (2013.01); *G03G 2215/2025* (2013.01); *G03G 2215/2048* (2013.01)

(58) Field of Classification Search
CPC .............................................. G03G 15/2057
USPC ........................................ 399/320, 328, 329
See application file for complete search history.

(56) References Cited

U.S. PATENT DOCUMENTS

| 9,372,445 | B2 | 6/2016 | Mori et al. |
| 9,405,250 | B2 | 8/2016 | Ogawa et al. |
| 10,503,104 | B2 | 12/2019 | Matsuura |
| 2005/0006370 | A1 | 1/2005 | Suzumi |
| 2020/0249602 | A1* | 8/2020 | Inoue .................. G03G 15/657 |

FOREIGN PATENT DOCUMENTS

| EP | 2770377 A2 | 8/2014 |
| JP | 10-133501 A | 5/1998 |
| JP | 2001-222173 A | 8/2001 |

(Continued)

*Primary Examiner* — Hoan H Tran
(74) *Attorney, Agent, or Firm* — Foley & Lardner LLP

(57) ABSTRACT

An example fixing unit includes a flexible fixing belt, a backup member located outside the fixing belt to form a fixing nip, and a plate heater in contact with the fixing belt to heat the fixing belt in the fixing nip, wherein the fixing belt includes a first abrasion prevention layer disposed on a surface facing the plate heater and including polyetheretherketone (PEEK), and the plate heater includes a second abrasion prevention layer in contact with the first abrasion prevention layer and including glass.

14 Claims, 9 Drawing Sheets

(56) References Cited

FOREIGN PATENT DOCUMENTS

| | | | |
|---|---|---|---|
| JP | 2003-077621 A | | 3/2003 |
| JP | 2004013045 | * | 1/2014 |
| WO | 2014/081045 A1 | | 5/2014 |

* cited by examiner 150 110 130 120

150 110 120

FIXING APPARATUS FOR MINIMIZING ABRASION OF CONTACT SURFACE BETWEEN HEATER AND FIXING BELT

BACKGROUND

Printers using an electrophotographic method supply toner to an electrostatic latent image formed on an image receptor to form a visible toner image on the image receptor, transfer the visible toner image to a printing medium, and fix the transferred visible toner image on the printing medium.

A fixing process may include a process of applying heat and pressure to the toner image on the printing medium. A fixing unit may include a heating member and a pressing member that may engage with each other to form a fixing nip. The heating member is heated by a heater. The printing medium to which the toner image is transferred receives heat and pressure while passing through the fixing nip, and the toner image is fixed onto the printing medium.

In response to the demand for high speed printing and low energy fixing, a fixing belt having a small heat capacity may be used as the heating member. As the heater, a plate heater that locally heats the fixing belt in the fixing nip may be employed.

DETAILED DESCRIPTION OF EXAMPLES

Fixing units are classified according to heating methods. A heating roller method includes heating a heating roller in a non-contact manner by using a heater disposed inside the heating roller that has a hollow pipe shape. An on demand fusing (ODF) method includes locally heating a fixing nip of a fixing belt having a small heat capacity by using a plate heater disposed inside the fixing belt and contacting an inner surface of the fixing belt.

In the heating roller method, because the heat capacity of the heating roller is large, quick heating is difficult. That is, because it takes a long time to heat, quick heating is difficult. Also, the thermal efficiency is low.

In the ODF method in which the plate heater is disposed inside the fixing belt, because the fixing belt rotates while the inner surface of the fixing belt contacts the plate heater, abrasion may occur on a contact surface between the plate heater and the fixing belt. The abrasion may cause cracks in the fixing belt or the plate heater and reduce the lifespan of the fixing unit.

A fixing unit according to an example may include a certain abrasion prevention layer on the inner surface of the fixing belt, thereby minimizing damage due to abrasion on the contact surface between the plate heater and the fixing belt.

Figure 1:
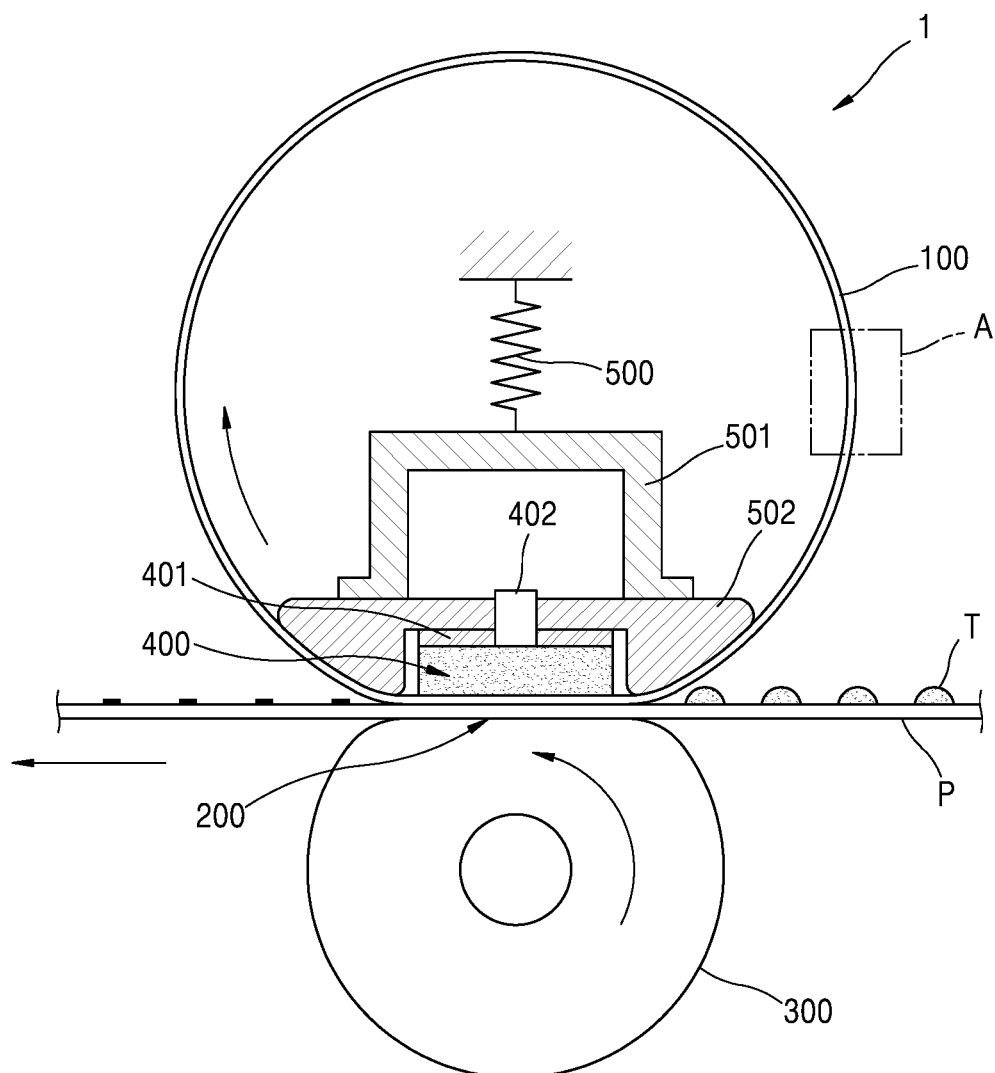
FIG. 1 is a schematic diagram of a fixing unit according to an example.

FIG. 1 is a schematic diagram of a fixing unit according to an example.

Referring to FIG. 1, a fixing unit 1 includes a flexible fixing belt 100, a backup member 300 located outside the fixing belt 100 to form a fixing nip 200, and a plate heater 400 in contact with the fixing belt 100 to heat the fixing belt 100 in the fixing nip 200. The fixing unit 1 may further include a temperature sensor 401 to detect the temperature of the plate heater 400 for temperature control, and a thermostat 402 as a safety apparatus.

The plate heater 400 may have a flat shape to heat the fixing belt 100 in the fixing nip 200. The plate heater 400 may be located inside the fixing belt 100 to heat the fixing belt 100. The backup member 300 may be located outside the fixing belt 100 to face the plate heater 400.

A pressing member 500 may provide a pressing force to at least one of the plate heater 400 or the backup member 300. The plate heater 400 and the backup member 300 may be pressed toward each other by the pressing force of the pressing member 500 to form the fixing nip 200. The plate heater 400 is to heat the fixing belt 100 in the fixing nip 200. In a case where a printing medium P, such as paper, having a toner image T formed on its surface passes through the fixing nip 200, the toner image T is fixed to the paper P by heat and pressure.

Figure 2:
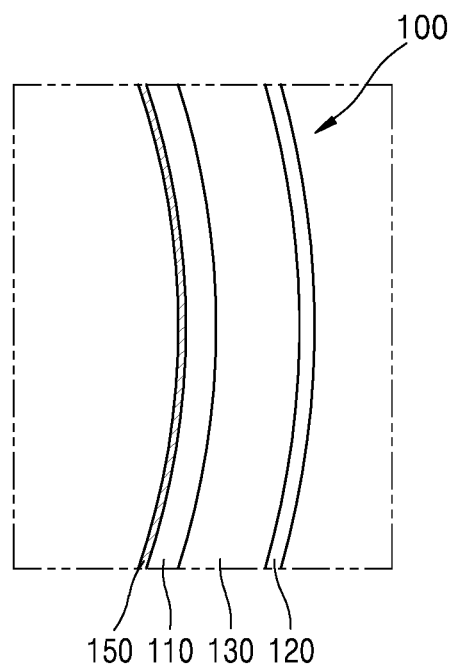
FIG. 2 is an enlarged view of a portion A which is a part of the fixing belt illustrated in FIG. 1 according to an example.
Figure 3:
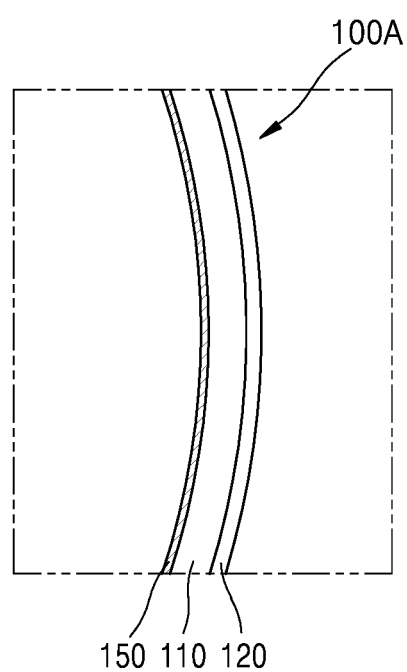
FIG. 3 is a diagram illustrating a part of a fixing belt according to an example.
Figure 4:
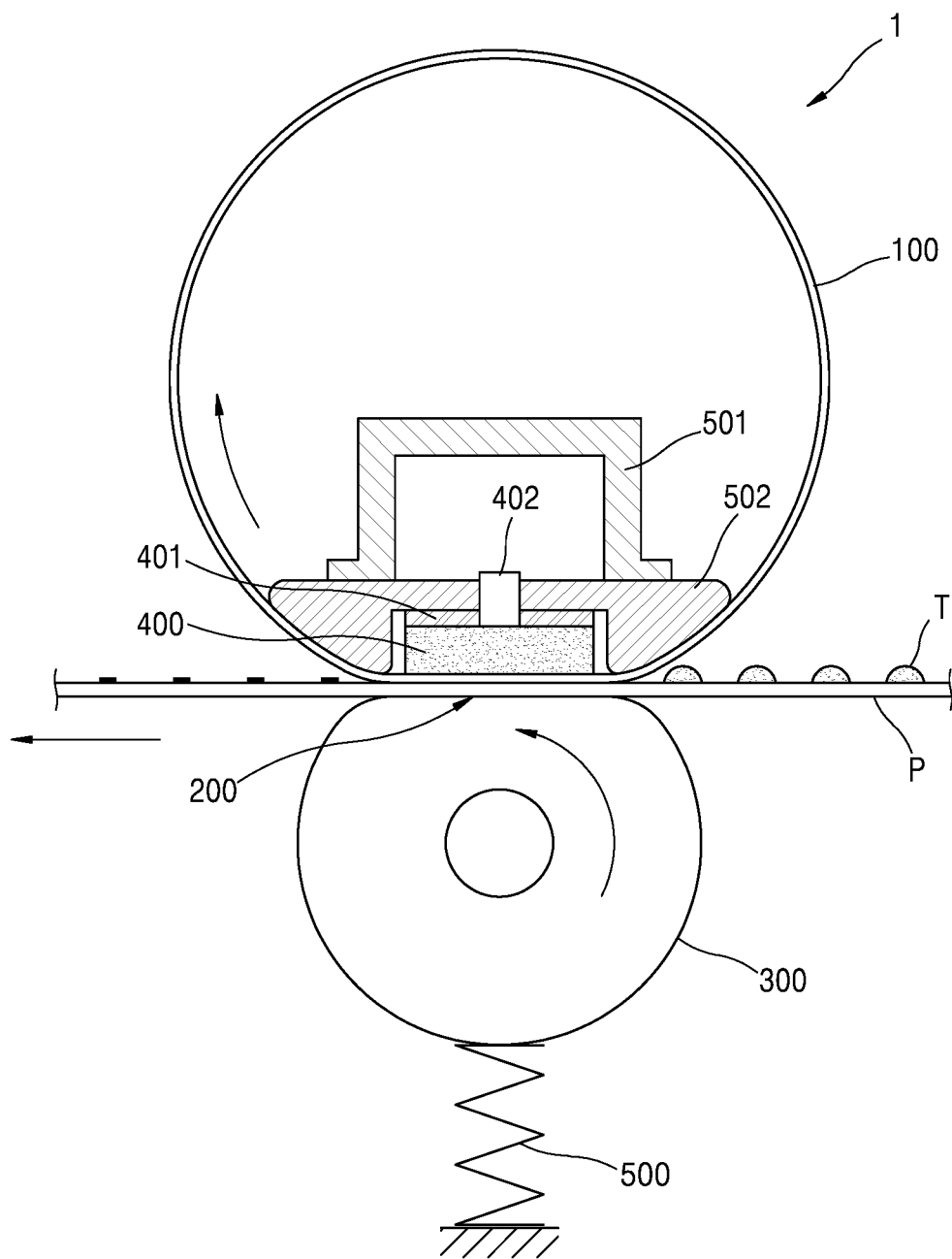
FIG. 4 is a schematic diagram of a fixing unit according to an example.

FIG. 2 is an enlarged view of a portion A which is a part of the fixing belt illustrated in FIG. 1 according to an example. FIG. 3 is a diagram illustrating a part of a fixing belt according to an example. FIG. 4 is a schematic diagram of a fixing unit according to an example.

Referring to FIG. 2, the fixing belt 100 may include a flexible base layer 110 and a releasing layer 120 disposed outside the base layer 110.

The base layer 110 may include a thin metal film such as stainless steel, nickel, nickel-copper, etc. The base layer 110 may include a polymer film having heat resistance and abrasion resistance capable of withstanding a fixing temperature such as a polyimide film, a polyamide film, a polyimideamide film, etc.

The thickness of the base layer 110 may be 30 μm to 200 μm. For example, the thickness of the base layer 110 may be 50 μm to 100 μm.

The releasing layer 120 disposed on the surface of the base layer 110 may include a resin layer to provide separability. For example, the releasing layer 120 may include a fluorine-based resin. For example, the releasing layer 120 may include perfluoroalkoxy (PFA), polytetrafluoroethylenes (PTFE), fluorinated ethylene propylene (FEP), etc.

The thickness of the releasing layer 120 may be 10 μm to 30 μm. For example, the thickness of the releasing layer 120 may be 15 μm to 25 μm.

To form a relatively wide and flat fixing nip 200, an elastic layer 130 may be interposed between the base layer 110 and the releasing layer 120. The elastic layer 130 may include a material having heat resistance capable of withstanding a fixing temperature. For example, the elastic layer 130 may include a rubber material, a thermoplastic elastomer, etc. The rubber material may include fluorine rubber, silicone rubber, natural rubber, isoprene rubber, butadiene rubber, nitrile rubber, chloroprene rubber, butyl rubber, acrylic rubber, hydrin rubber, urethane rubber, etc. The thermoplastic elastomer may include styrene, polyolefin, polyvinyl chloride vinyl, polyurethane, polyester, polyamide, polybutadiene, transpolyisofurene, chlorinated polyethylene, etc.

The thickness of the elastic layer 130 may be 100 μm to 300 μm. For example, the thickness of the elastic layer 130 may be 150 μm to 250 μm.

In an example, the elastic layer 130 may be an optional and thus may be omitted from a fixing belt 100A, as shown in FIG. 3.

Referring back to FIG. 1, the backup member 300 may include a backup roller to move the fixing belt 100. For example, the backup member 300 may press the plate heater 400 with the fixing belt 100 therebetween and rotate. The backup member 300 may include an elastic layer (not shown). As an example, the elastic layer may include rubber, thermoplastic elastomer, etc. A releasing layer (not shown) may be further provided on the outer surface of the elastic layer. The releasing layer may include PFA, PTFE, FEP, etc.

The pressing member 500 may provide, for example, a pressing force on the plate heater 400 toward the backup member 300. As an example, the pressing member 500 may provide the pressing force to a heater holder 502 supporting the plate heater 400 or a pressing bracket 501 connected to the heater holder 502. The structure to provide the pressing force to the plate heater 400 is not limited to the structure shown in FIG. 1. For example, as shown in FIG. 4, the pressing member 500 may have a structure to provide the pressing force to the plate heater 400 by pressing the backup member 300.

Figure 5:
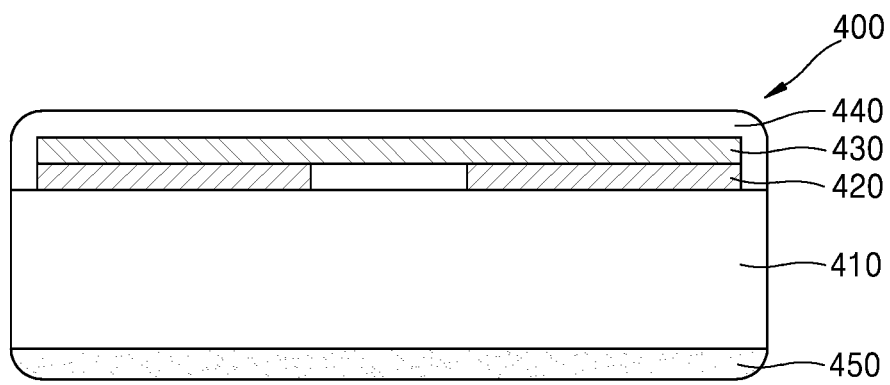
FIG. 5 is a schematic diagram illustrating a plate heater according to an example.

FIG. 5 is a schematic diagram illustrating a plate heater according to an example.

Referring to FIG. 5, the plate heater 400 may include a substrate 410, a heating layer 420 disposed on the substrate 410 and having a certain pattern, and an electrode 430 connected to the heating layer 420. The plate heater 400 may include an insulating layer 440 to cover the heating layer 420 and the electrode 430. The electrode 430 may be disposed on the upper portion of the heating layer 420. However, the arrangement of the electrode 430 is not limited thereto, and although not illustrated, the electrode 430 may be coplanar with the heating layer 420 on the substrate 410.

The substrate 410 may include a thermally conductive substrate. The substrate 410 may include, for example, a ceramic substrate. As the ceramic material, for example, alumina ($Al_2O_3$), aluminum nitride (AlN), etc. may be used.

The heating layer 420 may extend in the width direction of the paper P and receive electric energy through the electrode 430 to generate heat. The heating layer 420 may include, for example, a metal heating material such as a silver-palladium (Ag—Pd) alloy. A length of the heating layer 420 may be greater than a width of a printing medium.

The electrode 430 may be, for example, a silver-platinum (Ag_Pt) electrode, a silver (Ag) electrode, etc.

The insulating layer 440 may be provided on the plate heater 400. The insulating layer 440 may cover the heating layer 420 and the electrode 430. The insulating layer 440 may function as a protective layer to protect the heating layer 420 and the electrode 430. The insulating layer 440 may include glass, polyimide, etc.

The plate heater 400 may further include a second abrasion prevention layer 450 that will be described later. The second abrasion prevention layer 450 may be disposed on a surface of the substrate 410 toward the fixing belt 100. The second abrasion prevention layer 450 may include glass in consideration of heat resistance and abrasion resistance.

Heat generated from the heating layer 420 may be transferred to the fixing belt 100 through the substrate 410 to heat a region located in the fixing nip 200. By the heated fixing belt 100, the unfixed toner image T is fixed to the paper P.

Figure 6:
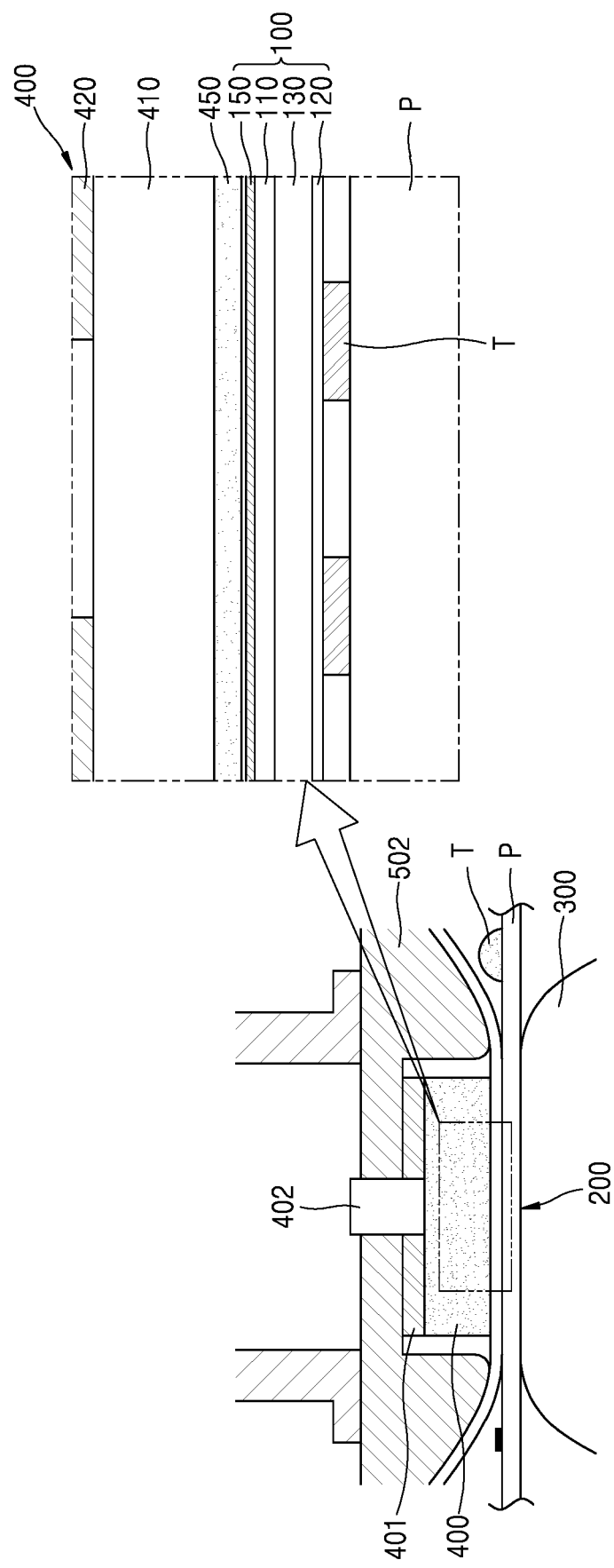
FIG. 6 is an enlarged view of a part of a fixing belt and a plate heater according to an example.
Figure 7:
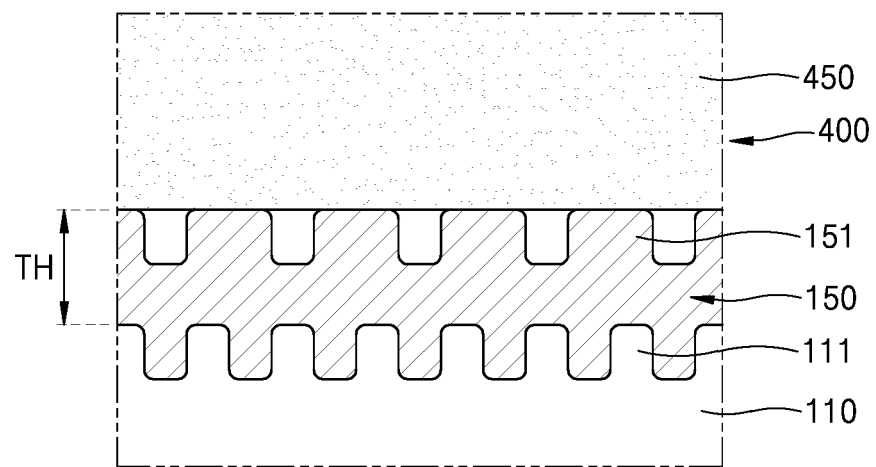
FIGS. 7 and 8 are diagrams illustrating a contact surface between a fixing belt and a plate heater according to an example.
Figure 8:
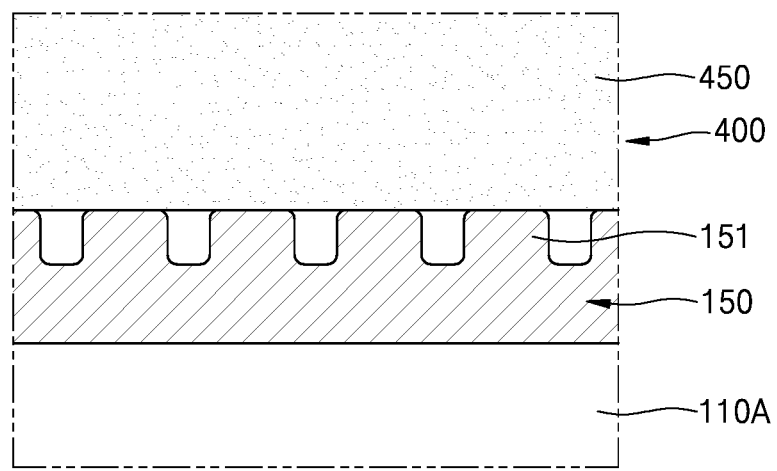

FIG. 6 is an enlarged view of a part of a fixing belt and a plate heater according to an example, and FIGS. 7 and 8 are diagrams illustrating a contact surface between a fixing belt and a plate heater according to an example.

Referring to FIGS. 1 and 6, in a fixing process, the fixing belt 100 rotates and moves. In that case, contact and friction occur between the plate heater 400, having a fixed position, and the fixing belt 100 that rotates and moves.

To reduce friction occurring between the plate heater 400 and the fixing belt 100, a lubricant such as grease may be injected between the fixing belt 100 and the plate heater 400. However, in a case where grease is injected, at least one of the fixing belt 100 and the plate heater 400 may still abrade despite the presence of grease. Because dust may be generated due to abrasion, the performance of grease may deteriorate. In that case, a torque for driving the fixing unit 1 may increase and cracks may occur in the fixing belt 100 or the fixing belt 100 may be damaged.

The fixing unit 1 according to an example may include a first abrasion prevention layer 150 disposed inside the fixing belt 100 in order to reduce or prevent abrasion between the fixing belt 100 and the plate heater 400.

The first abrasion prevention layer 150 may include a material having heat resistance and abrasion resistance. For example, the first abrasion prevention layer 150 may include polyetheretherketone (hereinafter referred to as "PEEK"). The content of PEEK in the first abrasion prevention layer 150 may be 1 wt % to 100 wt % with respect to the total weight of the first abrasion prevention layer 150. The thickness of the first abrasion prevention layer 150 may be 1 μm to 30 μm.

As an example, the first abrasion prevention layer 150 includes PEEK and a primer, and the content of the PEEK may be 5 wt % to 50 wt %. The material of the primer may include a polymer resin. As an example, the polymer resin may be a polyimide resin, an acrylic resin, a urethane resin, or a polyester resin, but is not necessarily limited thereto. The content of the primer may be 50 wt % to 95 wt %.

In an example in which the first abrasion prevention layer 150 includes PEEK and the primer, the thickness of the first abrasion prevention layer 150 may be reduced. For example, the thickness of the first abrasion prevention layer 150 may be less than or equal to 30 μm. For example, the thickness of the first abrasion prevention layer 150 may be less than or equal to 10 μm. In this case, the thickness of the first abrasion prevention layer 150 may be equal to or more than 1 μm.

In an example, the first abrasion prevention layer 150 may include PEEK and a fluorine-based resin. As an example of the fluorine-based resin, PFA, PTFE, FEP, etc. may be included.

For example, the first abrasion prevention layer 150 may include PEEK and PFA. The content of PEEK in the first abrasion prevention layer 150 may be 50 wt % to 99 wt %. The content of PFA may be 1 wt % to 50 wt %. The thickness of the first abrasion prevention layer 150 may be less than or equal to 30 μm. For example, the thickness of the first abrasion prevention layer 150 may be less than or equal to 20 μm. The thickness of the first abrasion prevention layer 150 may be equal to or more than 1 μm.

In an example, the first abrasion prevention layer 150 may consist of PEEK. The content of PEEK in the first abrasion prevention layer 150 may be 100 wt %.

The first abrasion prevention layer 150 may be located at the innermost side of the fixing belt 100 and disposed to contact the plate heater 400. Because the first abrasion prevention layer 150 has abrasion resistance, the first abrasion prevention layer 150 may reduce a phenomenon in which the inner surface of the fixing belt 100 abrades due to friction with the plate heater 400. In an example, the occurrence of scratches on the fixing belt 100 or damage to the fixing belt 100 may be reduced or prevented. Through the first abrasion prevention layer 150 according to an example, a long life of the fixing belt 100 may be obtained while reducing an amount of grease injected into the inside of the fixing belt 100 or not using any grease.

Referring to FIG. 7, an unevenness 151 may be formed on the surface of the first abrasion prevention layer 150 that faces the plate heater 400. The first abrasion prevention layer 150 may have a certain surface roughness.

For example, the surface roughness of the first abrasion prevention layer 150 may have an Ra value of 0.01 μm to 2 μm. For example, the surface roughness of the first abrasion prevention layer 150 may have an Rz value of 0.01 μm to 10 μm.

As the first abrasion prevention layer 150 has a certain surface roughness, a contact area with the plate heater 400 may be reduced or minimized. Accordingly, an amount of abrasion between the first abrasion prevention layer 150 and the plate heater 400 may be reduced.

As the contact area between the first abrasion prevention layer 150 and the plate heater 400 is reduced, the heat transfer rate from the plate heater 400 to the paper P may be slightly reduced. In consideration of this point, by selecting the material of the first abrasion prevention layer 150 as in the above examples, a thickness TH of the first abrasion prevention layer 150 may be reduced. For example, because the first abrasion prevention layer 150 includes PEEK and a primer, the thickness TH of the first abrasion prevention layer 150 may be less than or equal to 30 μm. For example, the thickness TH of the first abrasion prevention layer 150 may be less than or equal to 10 μm. The heat transfer rate may increase by reducing the thickness TH of the first abrasion prevention layer 150. In this way, by reducing the thickness TH of the first abrasion prevention layer 150, a reduction in the heat transfer rate due to the reduction in the contact area of the first abrasion prevention layer 150 may be addressed or compensated.

In the above-described example, a structure in which the first abrasion prevention layer 150 has the unevenness 151 is illustrated, but is not necessarily limited thereto. The first abrasion prevention layer 150 may have a surface without the unevenness 151 as necessary.

Referring to FIGS. 6, 7, and 8, the base layer 110 is disposed outside the first abrasion prevention layer 150.

The material of the base layer 110 may include polyimide, polyamide, polyimideamide, etc., or may include stainless steel, nickel, etc. For example, the material of the base layer 110 may include polyimide. For example, the material of the base layer 110 may include stainless steel.

As an example, the base layer 110 may include unevenness 111 formed on the surface facing the first abrasion prevention layer 150. Accordingly, a bonding force between the base layer 110 and the first abrasion prevention layer 150 may be strengthened. The surface roughness of the base layer 110 may be smaller than the surface roughness of the surface from the first abrasion prevention layer 150 toward the plate heater 400. However, in an example as shown in FIG. 8, a surface shape of a base layer 110A is not necessarily limited to an unevenness structure, and may have a flat shape without unevenness.

Referring back to FIG. 6, the plate heater 400 may further include the second abrasion prevention layer 450 that contacts the first abrasion prevention layer 150. In an example, the second abrasion prevention layer 450 may include glass. The second abrasion prevention layer 450 may be disposed on the surface of the substrate 410 facing the first abrasion prevention layer 150.

Because the second abrasion prevention layer 450 is disposed to be adjacent to the plate heater 400, the second abrasion prevention layer 450 may include a material having heat resistance. The second abrasion prevention layer 450 may include a material having higher heat resistance than the first abrasion prevention layer 150.

The second abrasion prevention layer 450 may include a material having abrasion resistance in consideration of friction with the first abrasion prevention layer 150. For example, the material of the second abrasion prevention layer 450 may include glass.

The thickness of the second abrasion prevention layer 450 may be 1 μm to 30 μm. By providing a thickness of the second abrasion prevention layer 450 to be less than or equal to 30 μm, the heat transfer rate from the plate heater 400 to the fixing belt 100 may be improved.

Figure 9:
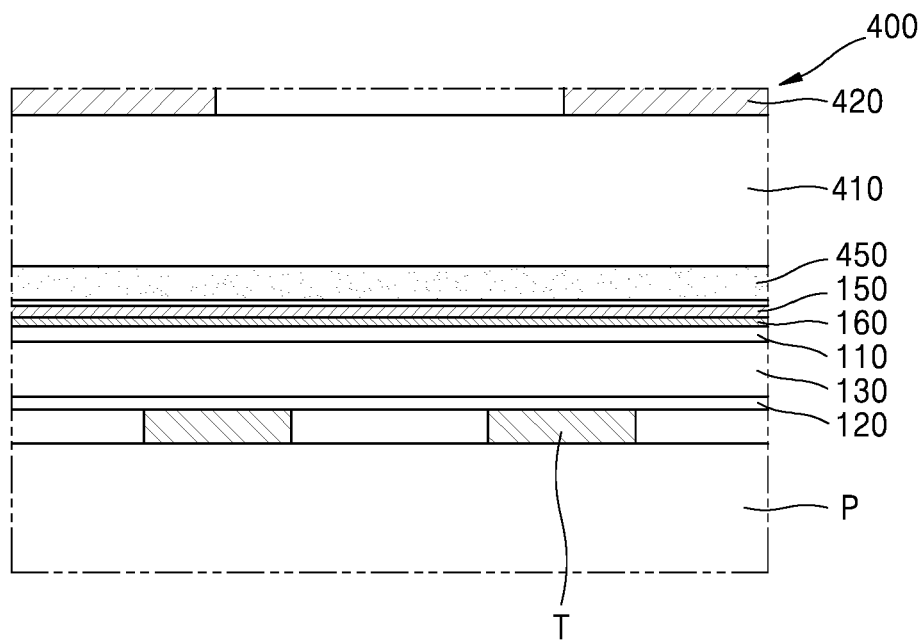
FIG. 9 is an enlarged view of a part of a fixing belt and a plate heater according to an example.
Figure 10:
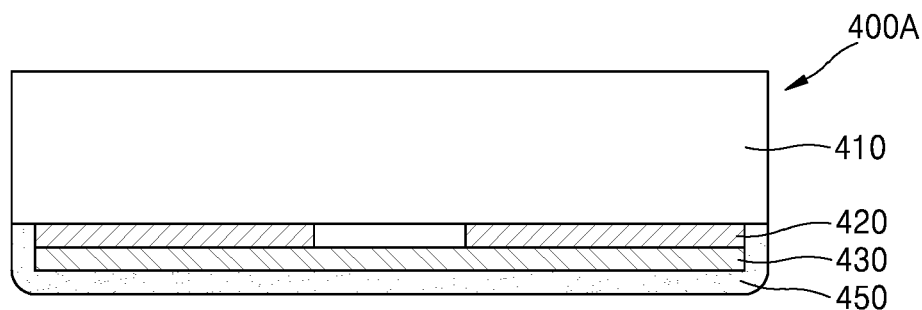
FIG. 10 is a schematic diagram illustrating a plate heater according to an example.

FIG. 9 is an enlarged view of a part of a fixing belt and a plate heater according to an example. FIG. 10 is a schematic diagram illustrating a plate heater according to an example.

In a fixing belt 100 according to the above-described example, the first abrasion prevention layer 150 is directly disposed on the base layer 110. However, the arrangement of the first abrasion prevention layer 150 is not limited thereto. For example, as shown in FIG. 9, the fixing belt 100 may further include a separate primer layer 160 between the first abrasion prevention layer 150 and the base layer 110. The thickness of the primer layer 160 may be 1 μm to 30 μm. The material of the primer layer 160 may include a polymer resin. As an example, the polymer resin may be a polyimide resin, an acrylic resin, a urethane resin, a polyester resin, etc., but is not limited thereto.

In addition, in the above-described example, the heating layer 420 and the electrode 430 of the plate heater 400 are disposed on the upper surface of the substrate 410. However, the arrangement of the heating layer 420 and the electrode 430 is not limited thereto. For example, as shown in FIG. 10, in a plate heater 400A according to an example, the heating layer 420 and the electrode 430 may be disposed on the surface facing the first abrasion prevention layer 150 on the substrate 410. In this regard, the second abrasion prevention layer 450 may cover the heating layer 420 and the electrode 430 and may function as an insulating layer. In this regard, the material of the base layer 110 of the fixing belt 100 may include polyimide which is a non-conductive material, in consideration of a short circuit with the electrode 430 of the plate heater 400.

Figure 11:
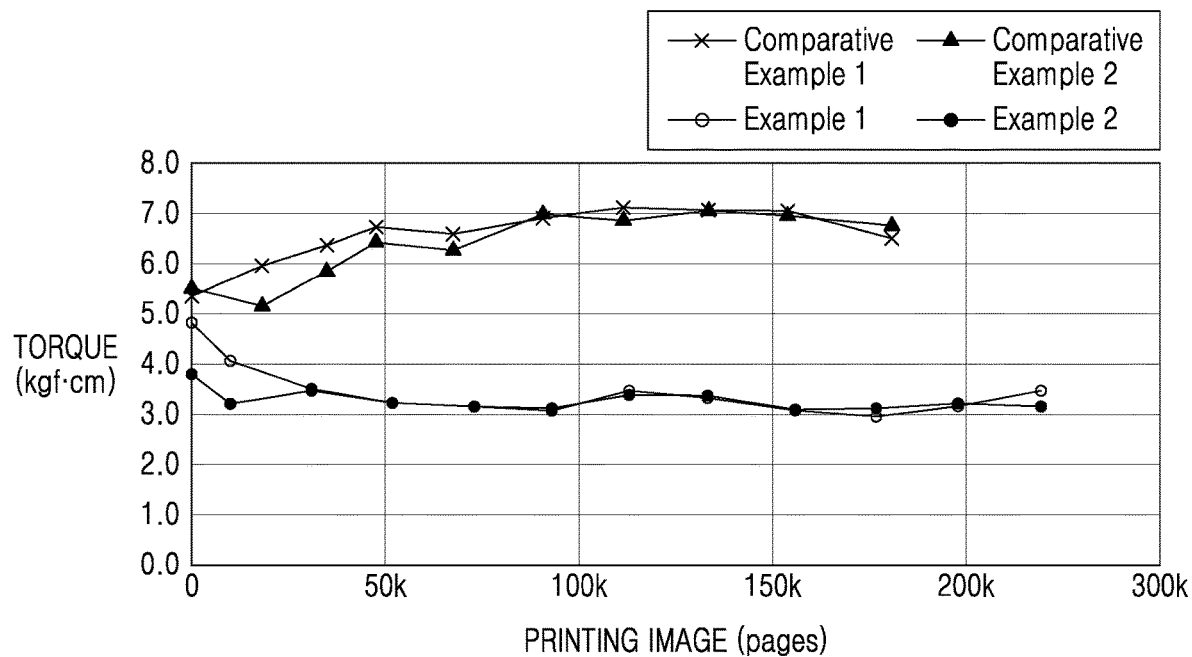
FIG. 11 illustrates a torque change in a fixing unit including a fixing belt in which a first abrasion prevention layer is disposed on an inner surface of the fixing belt and a fixing unit including a fixing belt in which the first abrasion prevention layer is not disposed.

FIG. 11 illustrates a torque change in a fixing unit including a fixing belt in which a first abrasion prevention layer is disposed on an inner surface of the fixing belt and a fixing unit including a fixing belt in which the first abrasion prevention layer is not disposed.

In the example fixing unit including the fixing belt 100 in which the first abrasion prevention layer 150 is disposed (hereinafter, referred to as the "fixing unit according to the example"), the material of the base layer 110 includes stainless steel, the material of the first abrasion prevention layer 150 includes PEEK and a primer, and the thickness of the first abrasion prevention layer 150 is 10 μm. In the fixing unit according to the example, grease is not injected between the fixing belt 100 and the plate heater 400. In FIG. 11, Examples 1 and 2 show that a fixing operation using the fixing unit according to the example is performed twice under the same conditions.

In the fixing unit including the fixing belt in which the first abrasion prevention layer 150 is not disposed (hereinafter, "the fixing unit according to a comparative example"), the fixing belt 100 includes the same elements as the fixing unit according to the example except for the first abrasion prevention layer 150. In the fixing unit according to the comparative example, in order to reduce abrasion, grease is injected between the fusing belt 100 and the plate heater 400. In FIG. 11, comparative examples 1 and 2 show that a fixing operation using the fixing unit according to the comparative example is performed twice under the same conditions.

Referring to FIG. 11, in the fixing unit according to the example, the driving torque of the fixing unit is generally low, ranging from 3 kgf·cm to 3.5 kgf·cm, and even if a printing amount increases, the driving torque increases slightly. In the fixing unit according to the comparative example, the driving torque of the fixing unit increases up to 7 kgf·cm, and as the printing amount increases, the driving torque increases by about 1 kgf·cm or more.

From this, it may be seen that the fixing unit according to the example including the first abrasion prevention layer 150 has a smaller driving torque as well as a smaller increase in the amount of driving torque according to the lifespan, compared to the fixing unit according to the comparative example that does not include the first abrasion prevention layer 150. Through this, it may be seen that by disposing the first abrasion prevention layer 150 on the inner surface of the fixing belt 100, a longer life of the fixing unit may be obtained.

In addition, it may be seen that in a case where the first abrasion prevention layer 150 is included on the inner surface of the fixing belt 100, without injecting grease between the fixing belt 100 and the plate heater 400, not only the driving torque of the fixing unit is small, but also the increase in the amount of driving torque of the fixing unit according to the lifespan is small.

Figure 12:
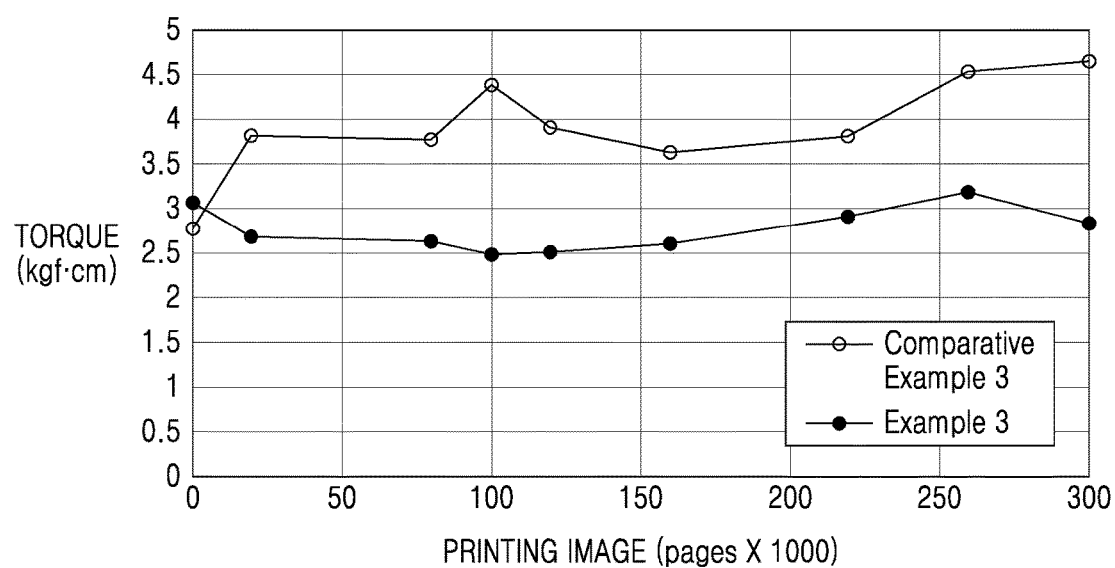
FIG. 12 is a graph showing a torque change in a fixing unit according to a material of a second abrasion prevention layer.

FIG. 12 is a graph showing a torque change in a fixing unit according to a material of a second abrasion prevention layer according to an example. In FIG. 12, in a case where the material of the second abrasion prevention layer 450 of the plate heater 400 includes glass and in a case where the material of the second abrasion prevention layer 450 of the plate heater 400 includes polyimide, which is a material other than glass, the torque of the fixing unit is measured.

Referring to FIG. 12, in the fixing unit (Example 3) including glass as the material of the second abrasion prevention layer 450, the driving torque of the fixing unit is low around 3 kgf·cm, and even if a printing amount increases, the change in the driving torque is very small at 0.7 kgf·cm. In the fixing unit (Comparative Example 3) including polyimide as the material of the second abrasion prevention layer 450, the drive torque of the fixing unit increases up to 4.7 kgf·cm, and as the amount of printing increases, the change in the drive torque is about 2 kgf·cm.

From this, it may be seen that the fixing unit including glass as the material of the second abrasion prevention layer 450 has a smaller driving torque as well as a smaller increase in the amount of driving torque according to the lifespan, compared to the fixing unit including polyimide as the material of the second abrasion prevention layer 450. Accordingly, it may be seen that the inclusion of glass as the material of the second abrasion prevention layer 450 is advantageous for obtaining a long life of the fixing unit.

Figure 13:
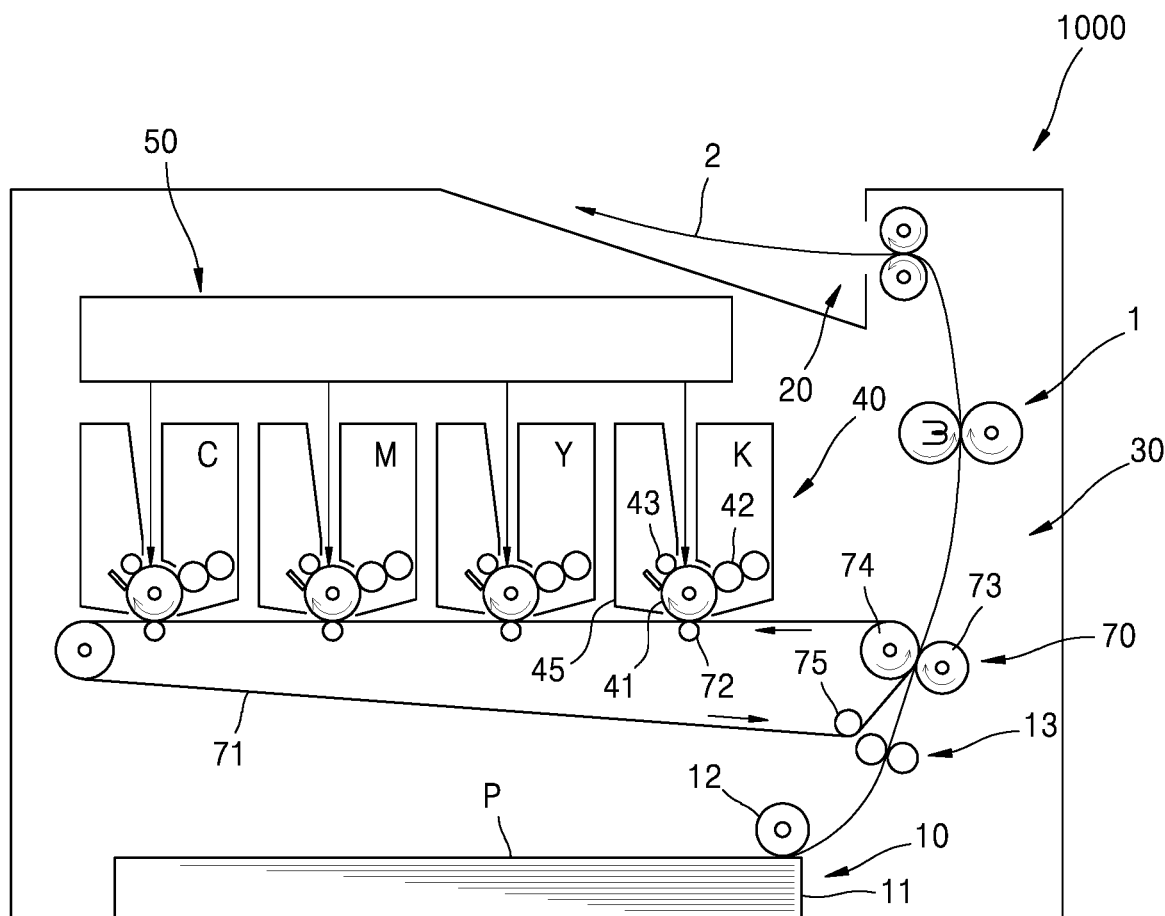
FIG. 13 is a diagram illustrating an image forming apparatus including a fixing unit according to an example.

FIG. 13 is a diagram illustrating an image forming apparatus including a fixing unit according to an example.

Referring to FIG. 13, an image forming apparatus 1000 may include an image forming unit 30 to transfer a toner image onto paper P, and the fusing unit 1 according to the above-described examples that applies heat and pressure to the paper P to which the toner image is transferred to fix the toner image onto the paper P. The image forming apparatus 1000 may further include a paper feeding unit 10 to supply the paper P to the image forming unit 30, and a paper discharge unit 20 in which the paper P on which the toner image is fixed may be loaded. A printing path 2 is to connect the paper feeding unit and the paper discharge unit 20.

The paper P loaded in the paper feeding unit 10 is withdrawn one by one and conveyed along the printing path 2. To this end, a pickup roller 12 is to withdraw the paper P from a paper feed tray 11 one by one. Conveying rollers 13 convey the withdrawn paper P along the printing path 2.

In the illustrated example, the paper feeding unit 10 is in the form of a paper feeding cassette, but an example of the paper feeding unit 10 is not limited thereto.

The image forming unit 30 is to transfer the toner image to the paper P conveyed along the printing path 2 using an electrophotographic method. The image forming unit 30 may include a developing device 40, an exposure device 50, and a transfer device 70.

In an example, the image forming unit 30 may selectively print a monochrome image and a color image on the paper P.

For color printing, the developing device 40 may include, for example, four developing devices 40 to develop images of cyan (C:cyan), magenta (M:magenta), yellow (Y:yellow), and black (K:black) colors. Each of the four developing devices 40 may contain a developer of cyan (C:cyan), magenta (M:magenta), yellow (Y:yellow), or black (K:black) color, such as a toner. The toners of cyan (C:cyan), magenta (M:magenta), yellow (Y:yellow), and black (K:black) colors may be respectively contained in four toner supply containers 45, and may be respectively supplied from the four toner supply containers 45 to the four developing devices 40. The image forming apparatus 1000 may further include a developer containing developing toners of various colors such as light magenta and white in addition to the above-described colors. The toner supply container 45 may be replaced in a case where the contained toner is consumed. The developing device 40 may be attached to or detached from the image forming apparatus 1000 through a door that is not shown.

Hereinafter, the image forming unit 30 including the four developing devices 40 will be described. Unless otherwise noted, reference numerals with C, M, Y, and K refer to components developing images of cyan (C:cyan), magenta (M:magenta), yellow (Y:yellow), and black (K:black) colors, respectively.

The developing device 40 may supply toner contained therein to an electrostatic latent image formed on a photosensitive drum 41.

The photosensitive drum 41 is an example of a photoreceptor having an electrostatic latent image formed on its surface and may include a conductive metal pipe and a photosensitive layer formed on the outer circumference thereof. A charging roller 42 may charge the surface of the photosensitive drum 41 to a uniform potential.

The exposure device 50 is to irradiate the photosensitive drum 41 with light modulated in correspondence with image information to form the electrostatic latent image on the photosensitive drum 41. As the exposure device 50, a laser scanning unit (LSU) using a laser diode as a light source, a light emitting diode (LED) exposure device using an LED as a light source, and the like may be employed.

A developing roller 43 is to supply a developer contained in the developing device 40, for example, toner, to the photosensitive drum 41 to develop the electrostatic latent image into a visible toner image. A developing bias voltage may be applied to the developing roller 43. In a case where a one-component developing method is employed, the toner may be contained in a toner supply container of the developing device 40. In a case where a two-component developing method is employed, the toner or toner and carrier may be contained in the toner supply container of the developing device 40. Although not shown in the drawing, the developing device 40 may further include a supply roller to supply the developer contained in the toner supply container to the developing roller 43, a regulating member attached to the surface of the developing roller 43 to regulate an amount of the developer supplied to a developing area where the photosensitive drum 41 and the developing roller 43 face each other, and an agitating member to agitate the developer contained in the toner supply container, etc.

The transfer device 70 may include an intermediate transfer belt 71, an intermediate transfer roller 72, and a transfer roller 73. The toner image developed on the photosensitive drum 41 of each of the developing device 40C, 40Y, and 40K may be intermittently transferred to the intermediate transfer belt 71. The intermediate transfer belt 71 is supported by support rollers 74 and to circulate.

The intermediate transfer belt 71 is a member on which the toner image may be formed on its surface, and the surface on which the toner image is formed is movable toward the transfer roller 73. The intermediate transfer belt 71 functions as an image conveying member to convey the toner image.

Four intermediate transfer rollers 72 are respectively arranged at positions facing the photosensitive drum 41 of the developing devices 40C, 40M, and 40K with the intermediate transfer belt 71 interposed therebetween. An intermediate transfer bias voltage for intermediately transferring the toner image developed on the photosensitive drum 41 to the intermediate transfer belt 71 may be applied to the four intermediate transfer rollers 72. Instead of the intermediate transfer roller 72, a corona transfer device or a pin scorotron transfer device may be employed. The transfer roller 73 is positioned to face the intermediate transfer belt 71. A transfer bias voltage for transferring the toner image intermediately transferred to the intermediate transfer belt 71 to the paper P may be applied to the transfer roller 73.

The toner images overlapping and transferred onto the intermediate transfer belt 71 by the transfer bias voltage applied to the transfer roller 73 may be transferred to the paper P.

The fixing unit 1 is to apply heat and pressure to the paper P on which the toner image is transferred to fix the toner image on the paper P.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A fixing unit comprising:
   a flexible fixing belt;
   a backup member located outside the fixing belt to form a fixing nip; and
   a plate heater in contact with the fixing belt to heat the fixing belt at the fixing nip,
   wherein the fixing belt comprises a first abrasion prevention layer disposed on a surface facing the plate heater and comprising polyetheretherketone (PEEK), and
   wherein the plate heater comprises a second abrasion prevention layer in contact with the first abrasion prevention layer and comprising glass, wherein a content of PEEK in the first abrasion prevention layer is 1 wt % to 100 wt % with respect to a total weight of the first abrasion prevention layer.

2. The fixing unit of claim 1,
   wherein the first abrasion prevention layer comprises PEEK and a primer, and
   wherein the content of PEEK is 5 wt % to 50 wt %.

3. The fixing unit of claim 1,
   wherein the first abrasion prevention layer comprises PEEK and a fluorine-based resin, and
   wherein the content of PEEK is 50 wt % to 99 wt %.

4. The fixing unit of claim 1, wherein the first abrasion prevention layer consists of PEEK.

5. The fixing unit of claim 1, wherein the fixing belt comprises a base layer disposed outside the first abrasion prevention layer.

6. The fixing unit of claim 5, wherein a material of the base layer comprises polyimide, polyamide, polyimideamide, stainless steel, or nickel.

7. The fixing unit of claim 5, wherein a surface of the base layer facing the first abrasion prevention layer comprises an unevenness.

8. The fixing unit of claim 5, further comprising a primer layer disposed between the first abrasion prevention layer and the base layer.

9. The fixing unit of claim 1, wherein a thickness of the second abrasion prevention layer is 1 μm to 30 μm.

10. A fixing unit comprising:
    a flexible fixing belt;
    a backup member located outside the fixing belt to form a fixing nip; and
    a plate heater in contact with the fixing belt to heat the fixing belt at the fixing nip,
    wherein the fixing belt comprises a first abrasion prevention layer disposed on a surface facing the plate heater and comprising polyetheretherketone (PEEK), and wherein the plate heater comprises a second abrasion prevention layer in contact with the first abrasion prevention layer and comprising glass, wherein a thickness of the first abrasion prevention layer is 1 μm to 30 μm.

11. A fixing unit comprising:
a flexible fixing belt;
a backup member located outside the fixing belt to form a fixing nip; and
a plate heater in contact with the fixing belt to heat the fixing belt at the fixing nip,
wherein the fixing belt comprises a first abrasion prevention layer disposed on a surface facing the plate heater and comprising polyetheretherketone (PEEK), and
wherein the plate heater comprises a second abrasion prevention layer in contact with the first abrasion prevention layer and comprising glass, wherein a surface of the first abrasion prevention layer facing the plate heater comprises an unevenness.

12. The fixing unit of claim 11, wherein a surface roughness of the first abrasion prevention layer has an Ra value of 0.01 μm to 2 μm.

13. The fixing unit of claim 11, wherein a surface roughness of the first abrasion prevention layer has an Rz value of 0.01 μm to 10 μm.

14. An image forming apparatus comprising:
an image forming unit to transfer a toner image onto a printing medium; and
a fixing unit to apply heat and pressure to the printing medium onto which the toner image is transferred and fix the toner image onto the printing medium,
wherein the fixing unit comprises:
a flexible fixing belt;
a backup member located outside the fixing belt to form a fixing nip; and
a plate heater in contact with the fixing belt to heat the fixing belt in the fixing nip,
wherein the fixing belt comprises a first abrasion prevention layer disposed on a surface facing the plate heater and comprising polyetheretherketone (PEEK), and
wherein the plate heater comprises a second abrasion prevention layer in contact with the first abrasion prevention layer and comprising glass, wherein a content of PEEK in the first abrasion prevention layer is 1 wt % to 100 wt % with respect to a total weight of the first abrasion prevention layer.

* * * * *